US009076149B2

(12) United States Patent

Sorensen et al.

(10) Patent No.: US 9,076,149 B2

(45) Date of Patent: Jul. 7, 2015

(54) SHOPPER VIEW TRACKING AND ANALYSIS SYSTEM AND METHOD

(75) Inventors: Herb Sorensen, Troutdale, OR (US); Marcus Hannon Geroux, Gresham, OR (US); David Albers, Gresham, OR (US)

(73) Assignee: Shopper Scientist LLC, Corbett, OR (US)

( * ) Notice: Subject to any disclaimer, the term of this patent is extended or adjusted under 35 U.S.C. 154(b) by 644 days.

(21) Appl. No.: 12/135,092

(22) Filed: Jun. 6, 2008

(65) Prior Publication Data

US 2008/0306756 A1 Dec. 11, 2008

Related U.S. Application Data

(60) Provisional application No. 60/943,011, filed on Jun. 8, 2007.

(51) Int. Cl.
*G06Q 30/02* (2012.01)
*G06Q 30/06* (2012.01)

(52) U.S. Cl.
CPC ............ *G06Q 30/02* (2013.01); *G06Q 30/0242* (2013.01); *G06Q 30/0641* (2013.01)

(58) Field of Classification Search
CPC ....................... G06Q 30/0641; G06Q 30/0242
USPC ..................................... 705/7.29, 14.41, 27.1
See application file for complete search history.

(56) References Cited

U.S. PATENT DOCUMENTS 7,168,618 B2 1/2007 Schwartz
2002/0085843 A1* 7/2002 Mann ............................ 396/374
2002/0178085 A1* 11/2002 Sorensen ........................ 705/26
2004/0111454 A1* 6/2004 Sorensen ...................... 708/200
2004/0130620 A1* 7/2004 Buehler et al. ................ 348/143
2004/0156020 A1* 8/2004 Edwards ....................... 351/209
2004/0199435 A1 10/2004 Abrams et al.
2005/0047629 A1* 3/2005 Farrell et al. .................. 382/117
2006/0010028 A1* 1/2006 Sorensen ........................ 705/10
2006/0244677 A1* 11/2006 Dempski .......................... 345/8

OTHER PUBLICATIONS

Gwen Schoen. Its in the bag When it comes to buying groceries, consumers are creatures of habit; [Metro Final Edition]. The Sacramento Bee. Sacramento, Calif.: Jun. 29, 2005. p. F.1. 4 pgs.*
Lewan, T. Here's a vision of the not-so-distant future: . . . [Derived headline]. The News—Item [Shamokin, Pa] Jan. 27, 2008: D.2.*
ISA, United States, International Search Report for PCT/US08/07207, Aug. 13, 2008, United States, 2 pages.

* cited by examiner

*Primary Examiner* — Timothy Padot

(74) *Attorney, Agent, or Firm* — Alleman Hall McCoy Russell & Tuttle LLP

(57) ABSTRACT

Devices, systems, and methods for tracking a view of a shopper are disclosed. The system may include camera coupled with a head of a shopper, and configured to capture one or more images in a field of view of the camera as captured image data. The shopper view tracking system may also include an analysis computing device configured to receive the captured image data, and an analysis program configured to determine an estimated shopper field of view having a boundary that is calculated to represent a probability of a person in a data sample having an actual measured focal point that occurs within the boundary, and to display the estimated shopper field of view superimposed on the one or more images in the captured image data. The analysis program further may be configured to generate an output including statistical measures based on the estimated field of view.

17 Claims, 8 Drawing Sheets

100
108
BRAND-X
CAKE
MIX
108
110

SHOPPER VIEW TRACKING AND ANALYSIS SYSTEM AND METHOD

CROSS-REFERENCE TO RELATED APPLICATION

This application claims priority under 35 U.S.C. §119 to U.S. provisional patent application Ser. No. 60/943,011, entitled EYE CAMERA TRACKING AND ANALYSIS SYSTEM AND METHOD, filed on Jun. 8, 2007, the entire disclosure of which is herein incorporated by reference.

TECHNICAL FIELD

The present invention relates generally to systems and methods to analyze shopper behaviors, and more particularly to a shopper view tracking and analysis system and method to analyze shopper behavior.

BACKGROUND

To analyze shopping behaviors, it may be useful to track the viewpoint of a shopper during a shopping trip. One prior device for recording a viewpoint of the user includes a first camera attached to eyeglasses and configured to capture images the user is looking at, as well as a second camera also mounted on the eyeglasses and oriented towards the user's eyes, which uses corneal reflections to detect the exact focal point of the irises of the shopper's eyes. Using input from the second camera, a cursor is laid on video captured by the first camera, which represents the user's actual eye focal point and movements over time. This prior system suffers from the drawback that it is expensive, generates a large amount of video data, and relies on corneal reflections that can produce inconsistent results, and thus is not suitable for researching the behavior of shoppers, particularly in large scale studies with a large numbers of subjects. This prior system can also require a significant amount of calibration. In addition, the system requires shoppers to wear a specialized pair of eyeglasses, which can be undesirable for some shoppers. In some settings this prior system can be unacceptable to many shoppers simply on "fashion" grounds alone. Another drawback of this approach is that it requires an accurate measurement of average focal distance in order to obtain substantially error-free measurements. This is often difficult in a retail shopping environment, since the average focus may change based on the path that a shopper travels through the environment, and their varying distance from fixtures.

SUMMARY OF THE INVENTION

Devices, systems, and methods for tracking a view of a shopper are disclosed. The shopper view tracking device may include camera configured to be coupled with a head of a shopper and configured to move with the head of the shopper while the shopper moves along a shopper path in a shopping environment. The camera may be configured to capture one or more images in a field of view of the camera as captured image data. The shopper view tracking device may also include an analysis computing device configured to receive the captured image data, and an analysis program executable by the analysis computing device and configured to determine an estimated shopper field of view having a boundary that is calculated to represent a probability of a person in a data sample having an actual measured focal point that occurs within the boundary, and to display the estimated shopper field of view superimposed on the one or more images in the captured image data. The analysis program further may be configured to generate an output including statistical measures based on the estimated field of view.

According to one aspect, the analysis program may further be configured to determine an estimated line of sight of the shopper, and an estimated focal point of the shopper, and the statistical measures in the output may be further based on the estimated line of sight and the estimated focal point.

According to another aspect, the estimated focal point may be calculated to represent an average focal point of a person in a data sample.

According to another aspect, the boundary may be in the shape of an ellipse.

According to another aspect, the probability represented by the ellipse is 50%, indicating that there is a 50% probability that the shopper's eyes are focused to a focal point that lies within the ellipse, based on the data sample. Another conveniently defined limit such as 80%, or any other specified amount, may also be used.

According to another aspect, the analysis computing device is further configured to impute a path of movement of the shopper while the shopper moves about the store by using the captured image data and one or more image recognition technologies.

According to another aspect, the analysis computing device includes stored images of the store, the stored images being associated with locations within the store, a location and path module including an image recognition module configured to impute a path of movement of the shopper about the store by associating the captured image data with the stored images.

According to another aspect, the location and path module includes a reverse perspective module to identify an angle of skew of a line of sight of the shopper by determining a degree of foreshortening of a known object captured in the one or more images when compare to the stored images.

According to another aspect, the analysis computing device includes an event recognition module configured to recognize one or more predetermined events, wherein the predetermined events are one or more of an exposure to the store, visiting a region of the store, shopping in a region of the store, an indication of an intent to purchase, purchasing a product, an estimated focal point to a product being within a predetermined threshold, and a product lying within an estimated field of view.

According to another aspect, the analysis computing device is further configured to calculate one or more pieces of statistical data, the statistical data being one of shopper density, flow through the store, trip progression through the store, visits to a display, shops of a product, purchases of one or more products, dwell times within a region, and measures indicating the visibility of a product to a shopper or set of shoppers over a period of time.

According to another aspect, a first transceiver is coupled with the camera and configured to transmit the captured image data, and a second transceiver is coupled with the analysis computing device configured to receive the transmitted captured image data.

The system may include a camera configured to be mounted to a head of a wearer, and configured to capture images of objects in a field of view of the wearer, an analysis computing device configured to receive the images, and an analysis program executable by the analysis computing device configured to superimpose a probability ellipse over the images to illustrate an estimated field of view of the wearer, the analysis program further configured to impute from the images an estimated position and an estimated line of sight of the wearer at a time of capture of the image data.

According to one aspect the system may include analysis computing device of the system includes an event recognition module configured to recognize one or more predetermined events.

According to another aspect, the wearer is a shopper in a store and wherein the predetermined events are one or more of an exposure to the store, visiting a region of the store, shopping in a region of the store, an indication of an intent to purchase, purchasing a product, an estimated focal point to a product being within a predetermined threshold, a product lying within an estimated field of view.

According to another aspect, the wearer is a shopper in a store and wherein the analysis program is further configured to calculate one or more pieces of statistical data, the statistical data being one of shopper density, flow through the store, trip progression through the store, visits to a display, shops of a product, purchases of one or more products, dwell times within a region, and measures indicating the visibility of a product to a shopper or set of shoppers over a period of time.

According to another aspect, the analysis program is further configured to display, via a graphical user interface, a position path connecting a series of positions of the wearer and a focal point path connecting estimated focal points at each of the positions of the wearer.

The method may include outfitting each of a plurality of shoppers with a camera coupled to each shopper's head such that a field of view of the camera moves with the shopper's head, capturing image data with the camera as each shopper moves about the store, determining an estimated shopper field of view having a boundary that is calculated to represent a probability of a person in a data sample having an actual measured focal point that occurs within the boundary, displaying the estimated shopper field of view of each shopper superimposed on the one or more images in the captured image data and determining the occurrence of shopping events within the estimated shopper field of view, and generating a report including statistical measures based on the shopping events that occurred within the estimated field of view of each of the plurality of shoppers.

According to one aspect, the method may further include determining an estimated line of sight of each shopper, and an estimated focal point of each shopper along the estimated line of sight, and the statistical measures in the report may be further based on the estimated line of sight and the estimated focal point.

According to another aspect, the estimated focal point is calculated to represent an average focal point of a person in a data sample.

According to another aspect, the boundary is in the shape of an ellipse.

According to another aspect, the method may further include imputing a location of the shopper within the store from the image data via an image recognition module.

According to another aspect, imputing the location of the shopper from the image data includes determining how near or how far the shopper is from an actual object in the store by comparing a size of a captured image from the image data to the size of a stored image of the object.

According to another aspect, the method further includes recognizing the occurrence of an event and a type of the event as one of exposure to the store, visiting a region of the store, shopping in a region of the store, an indication of an intent to purchase, purchasing a product, an estimated focal point to a product being within a predetermined threshold, and a product lying within an estimated field of view, and tabulating the occurrence of the event and the type of the event in a memory of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2-5 also illustrate example shopping events.

DETAILED DESCRIPTION OF THE PREFERRED EMBODIMENTS

System and methods are provided by which an area of focus of a shopper may be estimated by a camera tracking the shopper's view. Such tracking system may be implemented by using a camera device configured to capture the view of the shopper, i.e., to see what the shopper sees, and may address the above discussed drawbacks of prior methods of determining eye focus that involved tracking iris movement of an eye of a subject.

Figure 1:
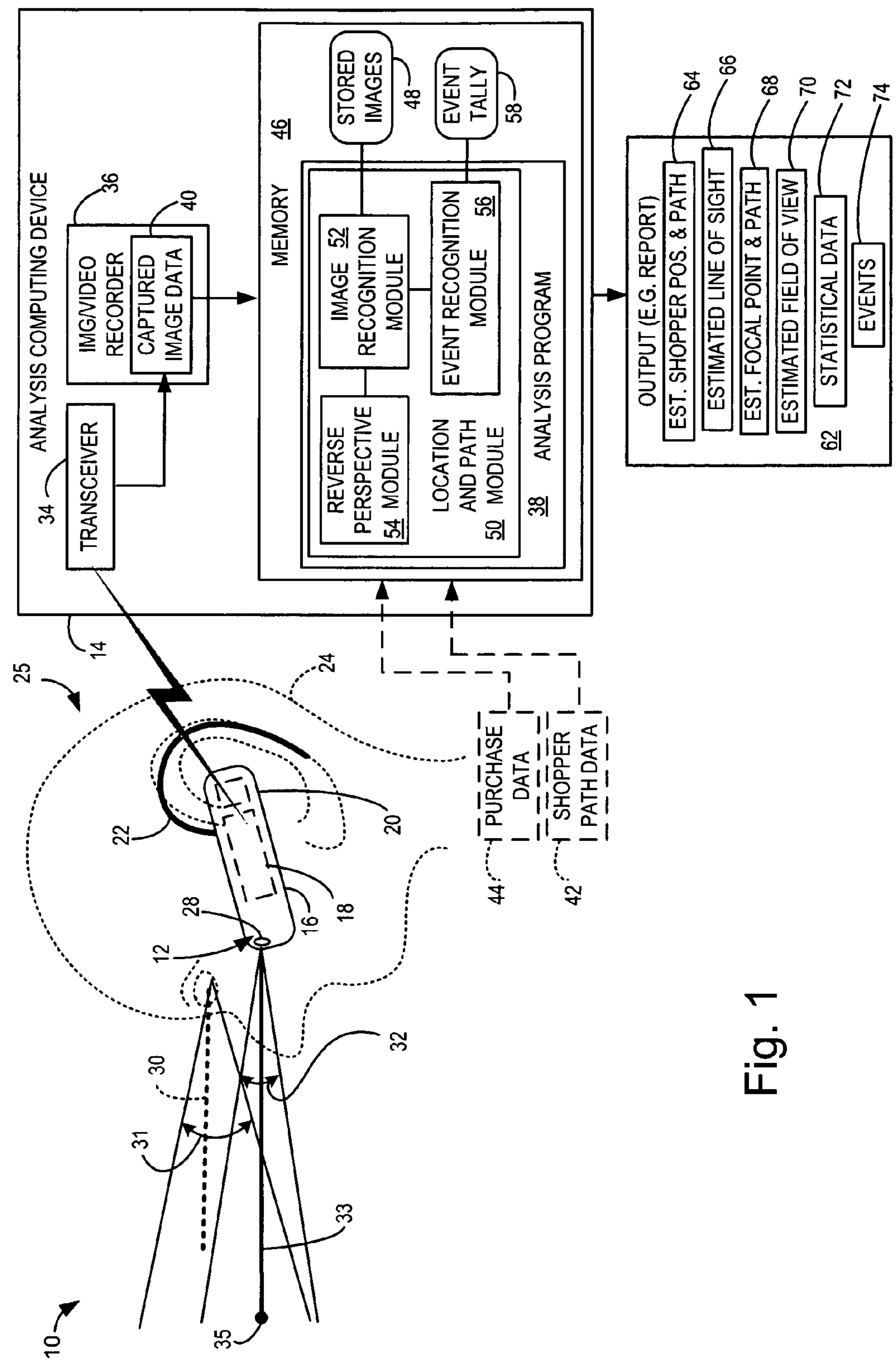
FIG. 1 shows an example embodiment of a view tracking and analysis system according to the present disclosure.

FIG. 1 shows an example embodiment of a shopper view tracking and analysis system 10, which may include a view tracking device 12 that may be linked to communicate with an analysis computing device 14. In the depicted embodiment, the view tracking device 12 may include a body 16 in which a transceiver 18 and battery 20 may be mounted, and to which a fixator 22 may be coupled. The fixator 22 may be configured to attach the view tracking device to a user, for example, to the head 24 of a wearer, or user 25, of the device. The user 25 may be a shopper 25. In the depicted embodiment, the fixator 22 may be configured to attach to an ear of the user. It will be appreciated that the body 16 may also include an ear bud, configured to rest in the outer ear canal of the user. Alternatively, the fixator 22 may be configured to attach to the head 24 of the user 25 as a headband or hat, eyeglasses, or other suitable device.

The view tracking device 12 may include a camera 28, which may be referred to as an eye camera. The eye camera may be mounted in the body 16 of the device 12, and may be oriented so as to point in a direction aligned with the orientation of the user's head 24. Thus, camera 28 may have a camera line of sight 33 that is aligned and parallel with a straight forward line of sight 30 of the shopper 25, which originates from the shopper's eyes and extends as if the shopper's eyes were focused straight ahead relative to the position of the shopper's head 24. Just as the shopper has an actual field of view 31 extending around the straight forward line of sight 30, the camera 28 may include a camera field of view 32 that extends around the camera line of sight 33.

The tracking system 10 may be configured to make the assumption for analysis purposes that the shopper 25 sees things straight forward from the eyes, instead of seeing things out the corners of the eyes. This assumption is generally true in most situations, especially when shoppers 25 visit a store for shopping. Thus, the camera line of sight 33 may function as an estimated line of sight 33 of the user, since it is positioned parallel and proximate to the straight forward line of sight 30 emanating from the user's eyes. It will be appreciated that a camera positioned as shown in FIG. 1 may effectively follow a straight forward field of view 31 of the shopper as the shopper's head turns back and forth during a shopping trip. The view tracking device 12 may thus capture images that approximate what the shopper 25 is most likely seeing, assuming the shopper is looking straight ahead.

Images, such as still images and/or moving images in the form of video, may be captured via the camera 28 and sent to the analysis computing device 14 via the transceiver 18 in tracking device 12, to be received by a transceiver 34 in the analysis computing device 14. These images may be recorded by a recorder 36 (such as a still image or video recorder) as shopper view or captured image data 40, and may be analyzed by an analysis program 38 that is executed by the analysis computing device 14.

The analysis program 38 may be resident in memory 46, and configured to receive the captured image data 40 from the recorder 36, or otherwise to access the captured data from a mass storage device, etc. In some embodiments, the analysis program 38 may also be configured to receive shopper path 42 data and product purchase data 44 from outside sources, as discussed below.

It should be appreciated that the camera 28 can be any suitable image capture device that captures the shopper's view as the shopper travels in the store, such as a video camera or still image camera. Further, it should be appreciated that the camera 28 may be positioned in any location on the shopper's head 24 that may follow the sight line of the shopper.

The memory 46 may be configured to store one or more stored images 48 of the store. The stored images 48 may be associated with various predetermined locations within the store. A location and path module 50 may include an image recognition module 52, and may be configured to impute a path of movement of the shopper about the store by associating the captured image data 40 with the stored images 48.

The location and path module 50 may include a reverse perspective module 54 that may be configured to identify an angle of skew of a line of sight of the shopper by determining a degree of foreshortening of a known object captured in the one or more images when compare to the stored images.

The analysis program 38 may also include an event recognition module 56 configured to recognize one or more predetermined events wherein the predetermined events may be one or more of an exposure to the store, visiting a region of the store, shopping in a region of the store, an indication of an intent to purchase, purchasing a product, an estimated focal point to a product being within a predetermined threshold, and a product lying within an estimated field of view. An event tally 58 may be included in the memory 46.

The analysis program 38 may be configured to produce output 62. The output 62 may be produced for each shopper and may include: an estimated shopper position and path 64, which may be included for each position along the path; an estimated line of sight 66; estimated focus 68 or focal point; and an estimated field of view 70. The analysis program 38 may be further configured to produce statistical data 72 such as shopper density, flow, trip progression, visits/shops/purchases to a region, dwell times within a region, and measures indicating the visibility of a product to a shopper or set of shoppers over a period of time. The output 62 produced may also include information about shopper events 74 such the number and type of events.

Further, the analysis program may be configured to compute an average distance to point of focus, an average focus dwell time, and may be able to compute the various measures discussed herein on product-by-product basis, and/or on display type basis, such that data may be examined for a specific type (e.g., breakfast cereal) or brand of product (e.g., GENERAL MILLS®), or display type (e.g., end cap or center aisle), etc.

Figure 2:
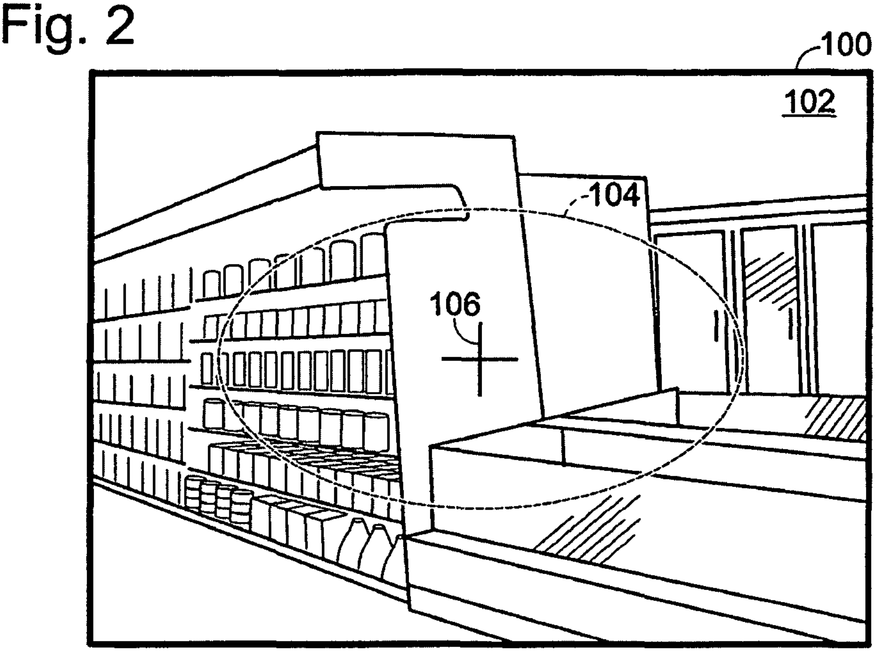
FIGS. 2-5 illustrate example fields of view captured by the view tracking and analysis system of FIG. 1.

FIG. 2 illustrates an example captured image 100 captured by the camera 28 shown in FIG. 1. Captured image 100 depicts a retail store 102, and superimposed on the image of the retail store is a probability area. The probability area 104 may be of any suitable shape but in the depicted embodiment is in the shape of a probability ellipse 104. A center 106 of the probability ellipse is indicated by a "+" symbol, which represents an estimated focal point 35 focus point of the estimated line of sight 33 of the camera 28 shown in FIG. 1. An estimated field of view 32 may be defined surrounding the estimated focal point. In one embodiment, the estimated field of view 32 is defined to be bounded by the area within the probability area 104, which may be a probability ellipse.

The probability ellipse 104 may demarcate the percentage of focus of the view. In the depicted example, the probability ellipse may indicate, for example, that 50% of the time a user's actual line of sight will fall within the ellipse in the field of view. Likewise, there is a 50% probability that the user's actual line of sight will fall outside the ellipse. This probability ellipse 104 may be constructed based on data collected by tracking actual eye movements of actual shoppers. It should be appreciated that any suitable percentage of focus of view may be used to define the probability ellipse, and thus the size of the probability ellipse may relatively expand and contract, as desired. In another embodiment, for example, 70% probability ellipses may be used. An average focal point for all shoppers may be estimated to be at a location such as the center 106 of the ellipse, as indicated by the "+" symbol. The exact location of the average focal point within the ellipse may also be determined through statistical analysis of actual eye movements of shoppers, and it will be appreciated that the exact location may vary from the center of the ellipse, depending on the outcome of such statistical analysis. By defining the estimated field of view 32 as being bounded by probability area 104, various statistical measures regarding the visibility of products and displays to shoppers may be efficiently computed, without determining the actual field of view of each shopper.

In this manner, the view tracking device may provide information on the estimated focal point and/or estimated field of view of the shopper, based on a statistical average focal point and probable field of focus data that has been derived from studies involving actual eye measurement of groups of users. Because the estimated focal point or the estimated field of focus may be derived from the actual measurement of a camera that rotates with the shopper's head position, the data obtained from the tracking device 12 of the view tracking and analysis system 10 may be comparable in reliability to the data obtained from the conventional video device that measures the actual focal point by detecting the actual eye movement. Because the view tracking device may be based on inexpensive camera technology, the cost of the view tracking device can be significantly low compared with a sophisticated, professional quality video camera.

As discussed above, shopper view data from the shopper view tracking and analysis system 10 may be used by the analysis program 38 to impute an estimated shopper position and path, which may have the potential advantage of not requiring data from external shopper tracking systems. In cases where such shopper path data is available from such external sources, it will be appreciated that the shopper path data may alternatively be obtained from these sources, as discussed above. For positions along the shopper path, an estimated line of sight 33, an estimated focal point 35, and estimated field of view 32 may be computed by the analysis program 38, based on the captured image data 40. Further, measures such as "average distance to point of focus," "average angle of the line of sight," and "focus dwell time" can be determined through dual tracking of a shopper's physical position and the shopper's point of focus. As discussed above, the analysis program 38 may further be configured to produce statistical data using the shopper view data and/or the shopper path and purchase data. For example, measures such as shopper density, flow, trip progression, visits/shops/purchases to a region, dwell times within a region, and measures indicating the visibility of a product to a shopper or set of shoppers over a period of time, may be computed. The above measures may be used to predict the shopper's behavior or shopping events using predictive modeling techniques, as described below.

Figure 3:
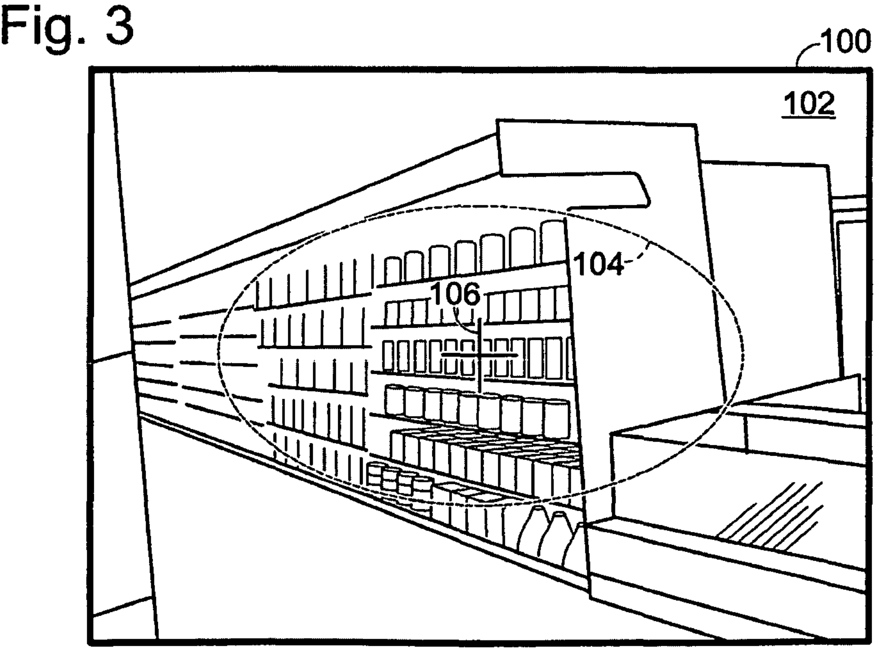
Figures 4, 5:
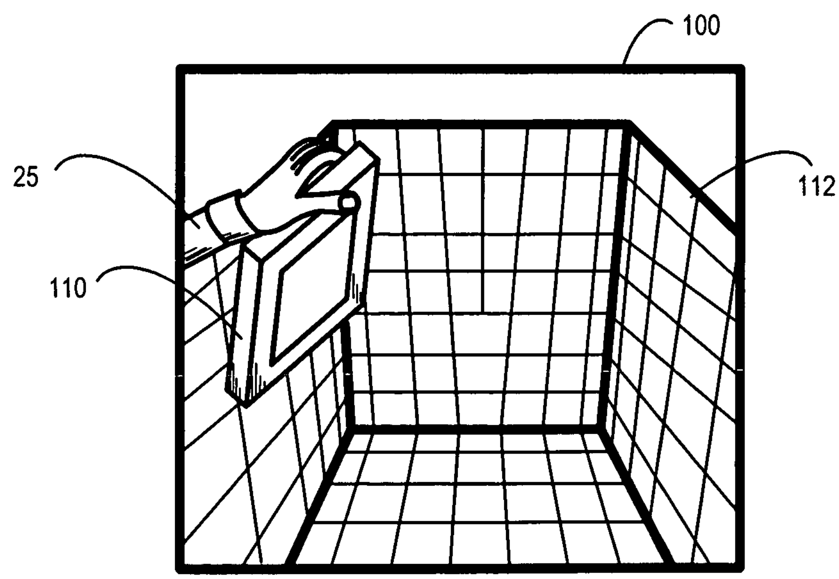

Referring still to FIG. 2 and to FIGS. 3, 4 and 5 wherein example shopping events are described, a shopper's trip in a store may include exposure to the store as shown in FIG. 2. The captured image 100 taken by the camera 28 may indicate that the shopper is looking generally at a display. This may be concluded because the center 106 of the ellipse, representing the focal point of the estimated line of sight of the shopper, is positioned on the display.

Then, in FIG. 3, the view changes, and another and different event is illustrated. In this view, the shopper may be considered to be visiting, or passing through the store displays such as an aisle section, as determined by a shoppers measured physical proximity to the aisle section. Further, the center 106 of the ellipse 104 indicates that the focal point of the shopper's estimated line of sight is positioned on product positioned on a middle shelf in the display.

Next, as illustrated in FIG. 4, the shopper may shop for a product, by physically picking up the product off of the shelf. One manner of determining a shopping event in a region adjacent a product is to detect a slowdown in shopper speed through the aisle section indicative of shopping activity. However, another manner enabled by the present embodiments, is to detect a shopping event by determining whether a shopper picks up a product, as shown by the shopper's hands 108, which are holding a product 110. Other suitable events that may be detected by visual inspection of captured data may also be defined. For example, a user scrutinizing a product on a shelf with a focal distance of less than a predetermined threshold, for a predetermined amount of time, may be defined as a shopping event for that product.

FIG. 5 is an illustration of a captured image 100 that may indicate a shopper's intent to purchase the product 110, as it shows the shopper 25 putting the product 110 into a shopping cart 112. Lastly, a sale or transaction may be conducted at a cash register which may be made evident by a field of view showing a check out aisle or the like. A sale or transaction may also be reflected in transaction data that is generated at the cash register, and which also may be transmitted to analysis program of the analysis computing device.

Figure 6:
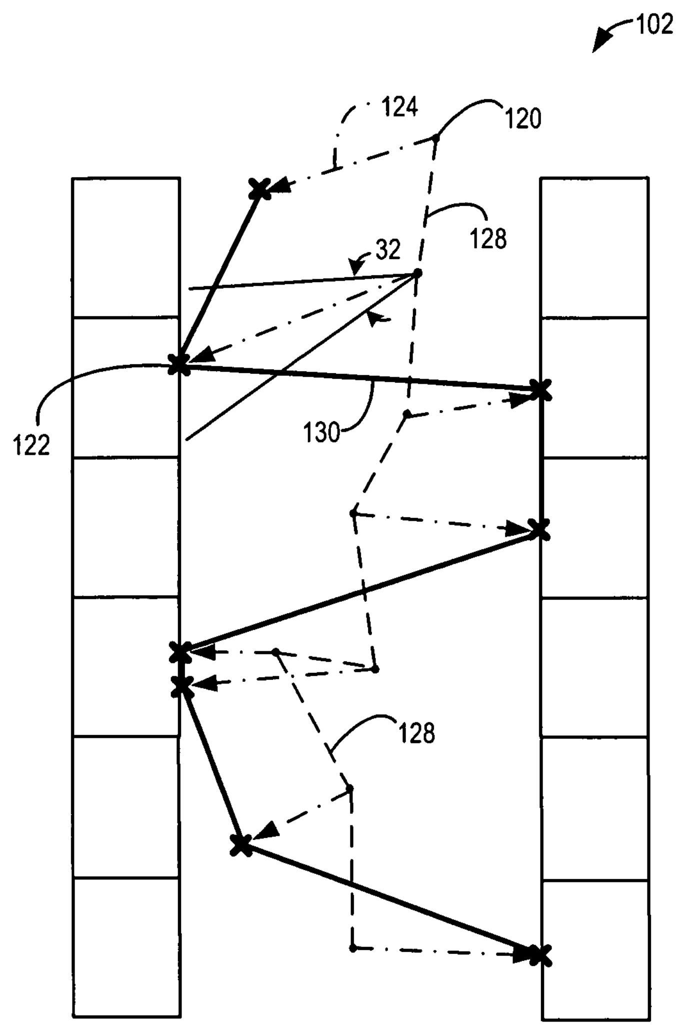
FIG. 6 shows a schematic map that may be generated from the view tracking and analysis system of FIG. 1, illustrating a shopper's physical positions, points of focus, and lines of sight during a shopper's trip in a store.

FIG. 6 shows a schematic map that may be generated from the shopper view tracking and analysis system 10 of the present disclosure. Measures of shopper's behaviors or shopping events may be possible through tracking the estimated line of sight and estimated focal points of one or more shoppers by the view tracking device 12 of system 10. Specifically, quantitative measures or metrics may be developed to describe the shopper's behaviors or shopping events through dual tracking of physical positions and focal points. FIG. 6 illustrates a shopper's physical positions 120, estimated focal points 122, also illustrated with "X"s, and estimated lines of sight 124 during the shopper's trip in a store 102. A shopper path 128 may be determined by connecting, or interpolating between the physical positions 120. Alternatively continuous or nearly continuous data points may be collected to produce shopper path 128. The shopper's physical position 120 and shopper path 128 may be estimated based on the shopper view data obtained from the view tracking device itself, for example, by technicians examining video and tracing a corresponding path on a map of the store using the analysis program. A focal point path 130 connecting the series of estimated focal points 122 may be determined, and displayed on the map, for example, via a bold line.

It will be appreciated that the process of producing a shopper path from shopper view data may be fully or partially automated using image recognition technologies. Alternatively, shopper position and path data may be imported from other sources as described above. These sources include, for example, data that is derived by hand tracking using in-person auditors, image capture and analysis using overhead cameras mounted in a store, RFID or other tracking of tags on shopping carts, or other suitable method. Estimated points of focus, and corresponding paths of focus connecting the points of focus, may be determined by the analysis computing device using data from the view tracking device as described above. Further, an estimated field of view may be imputed, as described above. An estimated line of sight of the shopper at a specific position may be determined by connecting the shopper's physical position with a corresponding point of focus. Further, the estimated line of sight may be defined by an angle relative to any suitable reference line and a distance to the point of focus. An estimated field of view may be computed to the scale of the probability ellipse described above.

Figure 7A:
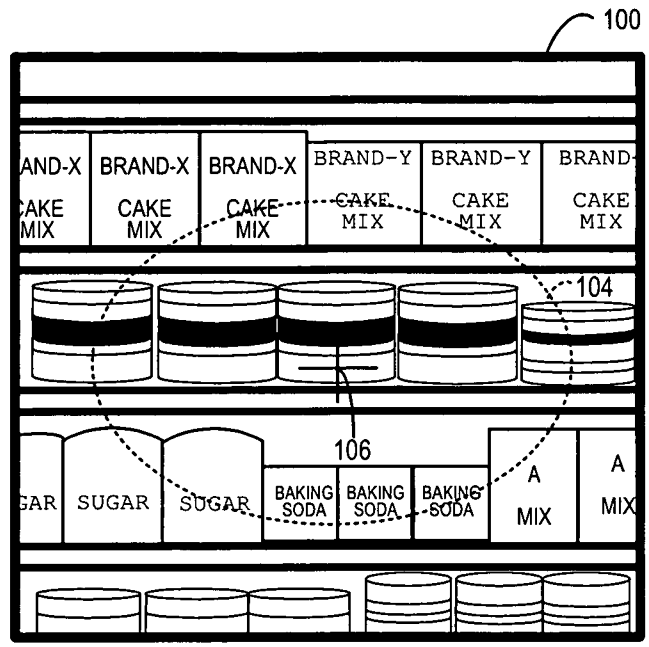
FIGS. 7*a*, 7*b*, 8*a*, 8*b*, 9*a*, and 9*b* illustrate respectively in pairs, example fields of view, and example schematic maps that may be generated from the respective fields of view using the view tracking and analysis system according to the present disclosure.
Figure 7B:
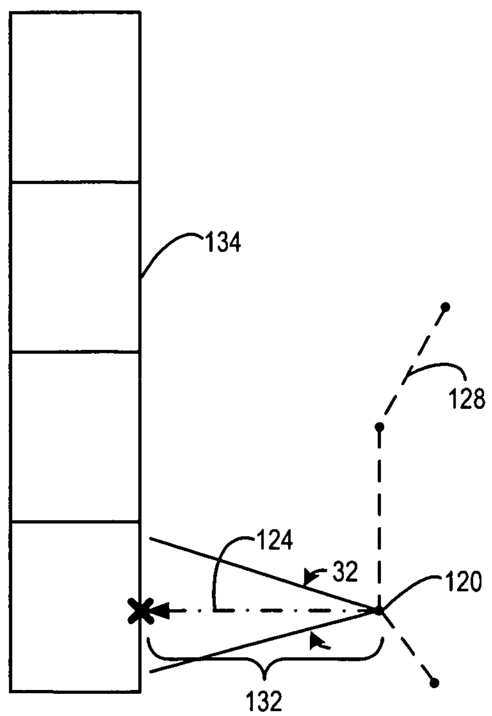
Figure 8A:
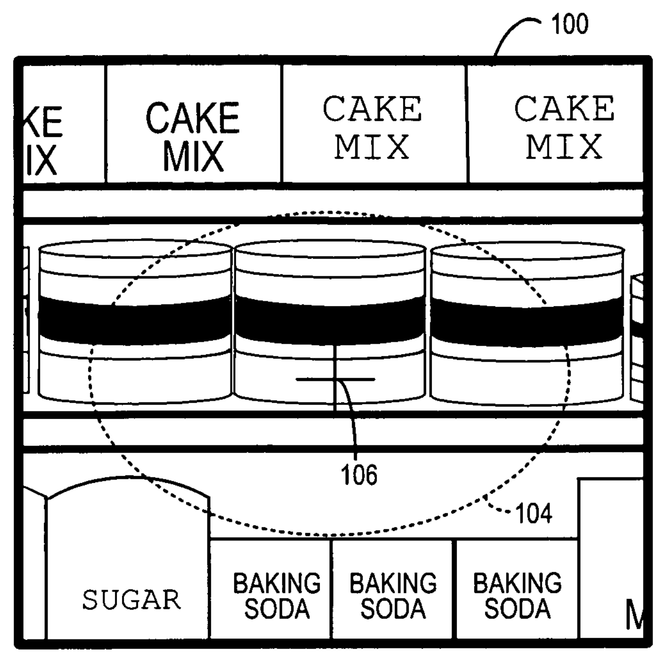
Figure 8B:
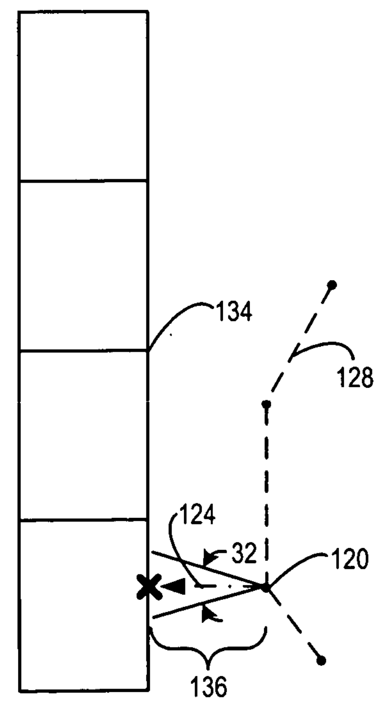

FIG. 7*a* illustrates a captured image 100 of the shopper view tracking and analysis system 10 shown in FIG. 1, and FIG. 7*b* is a schematic floor plan illustrating an imputed position 120 of the shopper. The size of the objects in the estimated field of view 32 contained within probability ellipse 104 may indicate that a shopper is a first distance 132 from a display shelf 134. By way of comparison, FIG. 8*a* illustrates another example captured image 100 in which the objects in the estimated field of view 32 contained within probability ellipse 104 are larger. Thus, it may be determined by the tracking and analysis system 10 that the shopper is a second, shorter distance 136 from the display shelf 134 as illustrated in FIG. 8*b*.

Figure 9A:
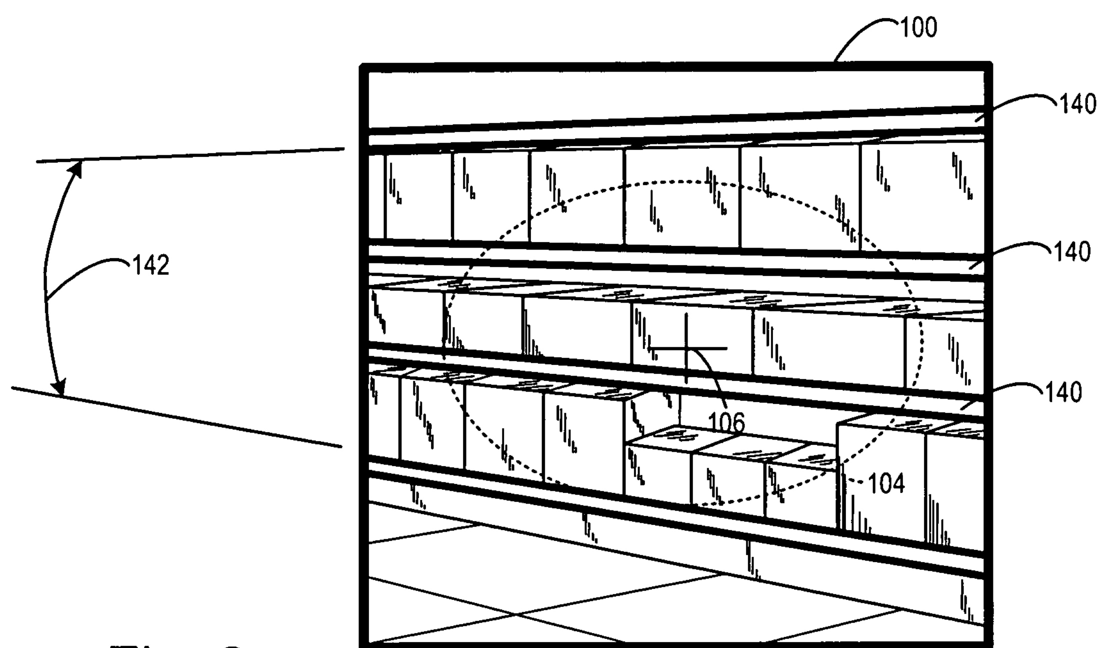
Figure 9B:
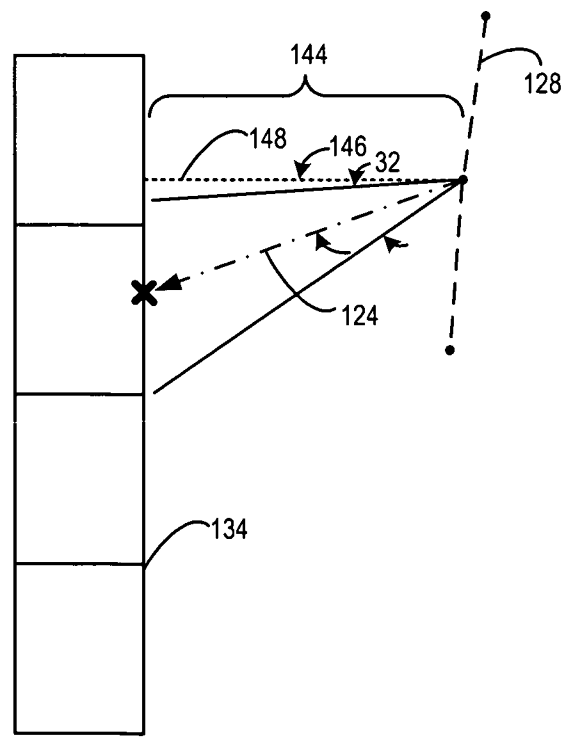

By way of further comparison, FIG. 9*a* illustrates yet another example captured image 100, and FIG. 9*b* illustrates a schematic floor plan related thereto. Objects may be recognized in the field of view, for example, by the image recognition module 52 of FIG. 1, and in this example the shelves 140 may be recognized. The shelves 140 may be known to be substantially horizontal, and therefore parallel, in the store but may be instead captured in the plane of the image to be at an angle 142. The parallel shelves in the image may be detected by the reverse perspective module 54 of FIG. 1 to meet at a vanishing point which would be to the left and outside the figure. Alternatively, or in addition, a degree of foreshortening of other known objects may be determined. The image recognition module 52 may then be configured to determine a distance 144 from the display shelf 134, and the reverse perspective module 54 may be configured to identify an angle of skew 146 of the estimated line of sight 124 of the shopper from a line 148 normal to the display shelf 134.

The occurrence of various shopping events may be correlated by the characteristics of the estimated line of sight 124. For example, when a purchase is made by the shopper, the line of sight and the distance to the point of focus may be different from other shopping events such as visits and shops. Since the purchase may be identified using purchase data 44, it is possible to determine an average distance to the point of focus and an average angle of the line of sight when the purchase is made for a shopper or a population of shoppers. In addition to averages, it will be appreciated that a probability distribution for these measures may also be determined. For example, a probability of purchase of a product by a shopper that views a product from within a certain distance and/or from a certain angle may be calculated. Similarly, other shopping events may be characterized from the map developed from the shopper view tracking and analysis system 10.

In some embodiments, since a layout of the store is typically known, points of focus of the shopper may be mapped onto the store layout, to provide an analyst a visual representation of the path of the focus of a shopper. The map may also show a shopper path of travel, and lines of sight of the shopper traveling along the path. Such a representation may be derived from the captured image data by the shopper view tracking and analysis system 10.

The shopper view tracking and analysis system 10 can provide meaningful information on a shopper's behaviors. For example, the focal points may indicate the shopper's interest and attention to displays of the shopping environment. Further, the probability of purchase based on focal point distance and/or viewing angle may provide feedback useful to alter the shopper traffic flow and product position to increase sales. Further such information may be useful for media rating companies such as advertising companies for their placement of advertisements.

It will be appreciated that the shopper view tracking and analysis system 10 may create metrics to measure various shopper's behaviors or shopping events. For example, for a given product position in a retail environment, the shopper view data may be used to compute an EyeShare® measurement representing the number of shopper trips on which, and/or the total amount of time during which, the product is within the estimated field of view (e.g. within the probability ellipse described above) for a population of shoppers. For example, the shopper view data from the camera may be used in combination with shopper path data to estimate this measurement. The shopper path data may be analyzed to identify shopper paths that possibly may be viewing the target product, and then the shopper view data may be analyzed for each identified path, to verify on which of the identified paths the product was actually within the estimated field of view (e.g. within the probability ellipse) of the shopper.

It should be appreciated that in some embodiments, information from the shopper view tracking and analysis system 10 may be combined with the statistical analysis to further identify and categorize shopping events and shopper behaviors. The shopper view tracking and analysis system 10 may perform shopping behavior analysis in a simple and cost effective manner by using a low-cost camera as the image capture device. Further, the cost may be reduced because the tracking and analysis may be performed by non-technical field staff. Moreover, the shopper view tracking and analysis system 10 may be employed to fully map the paths of all shoppers traveling through a store, as an alternative to mapping by in-person auditors, overhead image capture, or RFID tag tracking.

Figure 10:
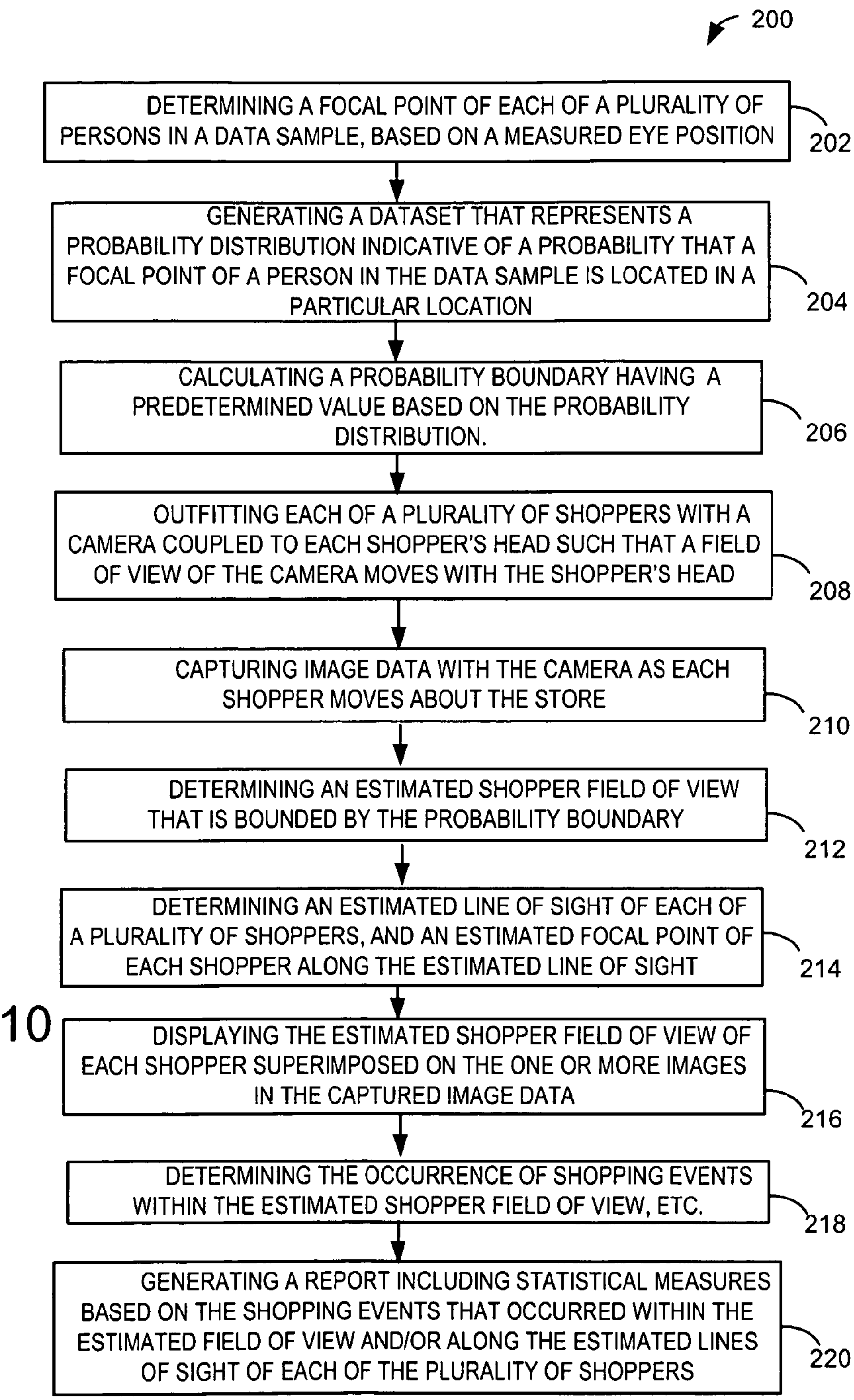
FIG. 10 is a flowchart illustrating an embodiment of a method for tracking and analyzing a view of a shopper within a store.

FIG. 10 illustrates one embodiment of a computerized method 200 for tracking and analyzing a view of a shopper within a store. Method 200 may include, at 202, determining a focal point of each of a plurality of persons in a data sample, based on a measured eye position. At 204, the method may include generating a dataset that represents a probability distribution indicative of a probability that a focal point of a person in the data sample is located in a particular location. At 206, the method may include calculating a boundary based on the probability distribution. The boundary is typically calculated to represent a probability of a person in a data sample having an actual measured focal point that occurs within the boundary. As described above, the boundary may be in the shape of an ellipse, and may be configured to represent a probability of, for example, 50%.

At 208, the method may further include outfitting each of a plurality of shoppers with a camera coupled to each shopper's head such that a field of view of the camera moves with the shopper's head. At 210, the method may include capturing image data with the camera as each shopper moves about the store. At 212, the method may include determining an estimated shopper field of view having a boundary that is calculated to represent a probability of a person in a data sample having an actual measured focal point that occurs within the boundary. The estimate field of view may be calculated as describe above.

At 214, the method may include determining an estimated line of sight of each shopper, and an estimated focal point of each shopper along the estimated line of sight. It will be appreciated that the estimated focal point may be calculated to represent an average focal point of a person in the data sample, as described above. At 216, the method may include displaying the estimated shopper field of view and/or the estimated line of sight and estimated focal point of each shopper superimposed on the one or more images in the captured image data. At 218, the method may include determining the occurrence of shopping events within the estimated shopper field of view and/or along the estimated line of sight or at the estimated focal point. The shopping event may be one of the various shopping events described above, and may include visiting, shopping, or purchasing a product in a region of a store, determining a focal point is within a predetermined distance from or at a predetermined angle related to a product or display, etc. At 220, the method may include generating a report including statistical measures based on the shopping events that occurred within the estimated field of view, along the estimated line of sight, and/or at the estimated focal point of each of the plurality of shoppers as they are moving along shopping paths within the shopping environment.

In some embodiments, the method may further include at imputing a location of a shopper within the store from the image data by using image recognition. As described above, this may include determining whether the shopper is within a predetermined distance to a product or display in the store, for example, by examining the size and orientation of objects depicted in the captured image data, and comparing the captured image data to stored reference image data.

Thus, according to the shopper view tracking and analysis system described above, shopping behaviors may be identified and measured in a manner that drastically reduces the costs associated with the video device and the use of technical professionals to execute the system operation. The system described above has the potential advantage that it does not require complicated calibration of the system with a measured average focal distance, which can produce errors in measurement results if mis-calibrated.

Although the above example embodiments have been described for use in a retail store, it should be appreciated that the method and system can be applied to various other applications in order to categorize specific events and behaviors.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

The invention claimed is:

1. A shopper view tracking device, comprising:

a camera configured to be coupled with a head of a shopper and configured to move with the head of the shopper while the shopper moves along a shopper path in a shopping environment, the camera further being configured to capture one or more images in a field of view of the camera as captured image data;

an analysis computing device configured to receive the captured image data;

a first transceiver coupled with the camera and configured to transmit the captured image data, and a second transceiver coupled with the analysis computing device configured to receive the transmitted captured image data; and an analysis program stored in memory of and executable by the analysis computing device and configured to:

determine an estimated shopper field of view within the field of view of the camera without determining an actual field of view of the shopper, the estimated shopper field of view having a boundary formed in the shape of an ellipse that is calculated to represent a probability of the shopper having an actual measured focal point that occurs within the boundary without measuring the actual measured focal point of the shopper, the probability based on a statistical average focal point and probable field of focus data that has been derived from studies involving actual eye measurement of groups of users;

display the estimated shopper field of view superimposed on the one or more images in the captured image data; and impute a path of movement of the shopper while the shopper moves about a store by using the captured image data and one or more image recognition technologies;

wherein the analysis program is further configured to generate an output including statistical measures based on one or more predetermined events that occur within the estimated field of view.

2. The shopper tracking device of claim 1, wherein the analysis program is further configured to determine an estimated line of sight of the shopper, and an estimated focal point of the shopper; and wherein the statistical measures in the output are further based on the estimated line of sight and the estimated focal point.

3. The shopper tracking device of claim 2, wherein the estimated focal point is calculated to represent an average focal point of a person in a data sample.

4. The shopper tracking device of claim 1, wherein the probability represented by the ellipse is 50%, indicating that there is a 50% probability that the shopper's eyes are focused to a focal point that lies within the ellipse, based on the data sample.

5. The shopper tracking device of claim 1, wherein the analysis computing device includes stored images of the store, the stored images being associated with locations within the store, a location and path module including an image recognition module configured to impute the path of movement of the shopper about the store by associating the captured image data with the stored images.

6. The shopper tracking device of claim 5, wherein the location and path module includes a reverse perspective module to identify an angle of skew of a line of sight of the shopper by determining a degree of foreshortening of a known object captured in the one or more images when compared to the stored images.

7. The shopper tracking device of claim 1, wherein the analysis computing device includes an event recognition module configured to recognize the one or more predetermined events, wherein the predetermined events are one or more of an exposure to the store, visiting a region of the store, shopping in a region of the store, an indication of an intent to purchase, purchasing a product, an estimated focal point to a product being within a predetermined threshold, and a product lying within an estimated field of view.

8. The shopper tracking device of claim 1, wherein the analysis computing device is further configured to calculate one or more pieces of statistical data, the statistical data being one of shopper density, flow through the store, trip progression through the store, visits to a display, shops of a product, purchases of one or more products, dwell times within a region, and measures indicating visibility of a product to a shopper or set of shoppers over a period of time.

9. A view tracking and analysis system, comprising:

a camera configured to be mounted to a head of a wearer, and configured to capture images of objects in a field of view of the wearer;

a first transceiver coupled with the camera and configured to transmit captured image data, and a second transceiver coupled with an analysis computing device configured to receive the transmitted captured image data;

the analysis computing device configured to receive the images via the second transceiver;

an analysis program stored in memory of and executable by the analysis computing device configured to superimpose a probability ellipse over the images to illustrate an estimated field of view of the wearer indicating a percentage of time a wearer's actual line of sight falls within the ellipse in a field of view without measuring the wearer's actual line of sight, the analysis program further configured to impute from the images an estimated position and an estimated line of sight of the wearer at a time of capture of the image data, and impute a path of movement of the shopper while the shopper moves about a store by using the captured image data and one or more image recognition technologies, wherein the probability ellipse is calculated to represent an average focal point and probable field of view based on data collected by tracking actual eye movements of actual shoppers.

10. The view tracking and analysis system of claim 9, wherein the analysis computing device includes an event recognition module configured to recognize one or more predetermined events.

11. The view tracking and analysis system of claim 10, wherein the wearer is a shopper in a store and wherein the predetermined events are one or more of an exposure to the store, visiting a region of the store, shopping in a region of the store, an indication of an intent to purchase, purchasing a product, an estimated focal point to a product being within a predetermined threshold, a product lying within an estimated field of view.

12. The view tracking and analysis system of claim 9, wherein the wearer is a shopper in a store and wherein the analysis program is further configured to calculate one or more pieces of statistical data, the statistical data being one of shopper density, flow through the store, trip progression through the store, visits to a display, shops of a product, purchases of one or more products, dwell times within a region, and measures indicating visibility of a product to a shopper or set of shoppers over a period of time.

13. The system of claim 9, wherein the analysis program is further configured to display, via a graphical user interface, a position path connecting a series of positions of the wearer and a focal point path connecting estimated focal points at each of the positions of the wearer.

14. A method for tracking and analyzing a view of a shopper within a store, comprising:

at an analysis computing device:

determining a focal point of each of a plurality of persons in a data sample;

generating a dataset that represents a probability distribution indicative of a probability that a focal point of a person in the data sample is located in a particular location;

calculating a boundary based on the probability distribution, the boundary being formed in the shape of an ellipse that is calculated to represent a probability of the shopper having an actual measured focal point that occurs within the boundary without measuring the actual measured focal point of the shopper, the probability based on a statistical average focal point and probable field of focus data that has been derived from studies involving actual eye measurement of groups of users;

receiving image data captured with a plurality of cameras with which a plurality of shoppers are outfitted, each camera coupled to a shopper's head such that a field of view of the camera moves with the shopper's head, the image data captured as each shopper moves about the store, wherein a first transceiver is coupled with the camera and configured to transmit the captured image data, and a second transceiver is coupled with the analysis computing device configured to receive the transmitted captured image data;

applying the boundary to determine an estimated shopper field of view to represent a probability of a shopper having an actual measured focal point that occurs within the boundary without determining an actual field of view of the shopper wherein the probability represented by the boundary indicates a percentage of time a shopper's actual line of sight falls within the boundary in a field of view;

displaying the estimated shopper field of view of each shopper superimposed on one or more images in the captured image data and determining an occurrence of shopping events within the estimated shopper field of view;

imputing a path of movement of the shopper while the shopper moves about a store by using the captured image data and one or more image recognition technologies; and generating a report including statistical measures based on the shopping events that occurred within the estimated field of view of each of the plurality of shoppers.

15. The method of claim 14, further comprising:

determining an estimated line of sight of each shopper, and an estimated focal point of each shopper along the estimated line of sight;

wherein the statistical measures in the report are further based on the estimated line of sight and the estimated focal point.

16. The method of claim 14, further comprising imputing a location of the shopper within the store from the image data via an image recognition module.

17. The method of claim 16, wherein the imputing the location of the shopper from the image data includes determining how near or how far the shopper is from an actual object in the store by comparing a size of a captured image from the image data to a size of a stored image of the object.

* * * * *